United States Patent Office 3,469,370
Patented Sept. 30, 1969

3,469,370
PURIFICATION OF HYDROGEN CHLORIDE PRODUCED DURING THE ALKYLATION OF BENZENE WITH CHLOROPARAFFINS
Matthew L. Becker, Philadelphia, Pa., assignor to Atlantic Richfield Company, Philadelphia, Pa., a corporation of Pennsylvania
No Drawing. Filed May 31, 1968, Ser. No. 733,256
Int. Cl. B01d 19/04, 59/28
U.S. Cl. 55—71                                 9 Claims

ABSTRACT OF THE DISCLOSURE

The hydrogen chloride gas produced as a by-product in the alkylation of benzene with chloroparaffins is purified by scrubbing the gas with a hydrocarbon boiling above about 275° F.

BACKGROUND OF THE INVENTION

Field of the invention

This invention relates to a method for the purification of gaseous hydrogen chloride produced as a by-product of the alkylation of benzene with chloroparaffins by scrubbing the gas to remove benzene therefrom, utilizing a hydrocarbon stream boiling about 100° F. above the boiling point of benzene, i.e., about 275° F.

Prior art

In the commercial method for the production of detergents, paraffins boiling in the range of from 9 to 18 carbon atoms are chlorinated and the resulting chloroparaffin-paraffin mixture is used to alkylate benzene in the presence of an aluminum chloride catalyst. The alkylated benzene is thereafter sulfonated to produce the detergents. Hydrogen chloride is produced both in the paraffin chlorination step and in the alkylation step and it, of course, must be recovered in order to render the process economical. Heretofore, the hydrogen chloride produced in the alkylation reaction has been contaminated with of the order of 1,000 parts per million of benzene. If the gaseous hydrogen chloride is dissolved in water to produce hydrochloric acid this benzene content makes it difficult to utilize rubber-like storage containers and the like. If the hydrogen chloride is utilized as a reagent in chemical processing, for example, synthesis of ethylene dichloride and the like, this high benzene content cannot be tolerated in the reaction.

Heretofore, there has not been an economical or technically feasible method for the removal of benzene down to the required level of about 30 to 50 parts per million.

The present invention provides a method for removing benzene from the gas produced by the alkylation reaction wherein benzene is alkylated with chloroparaffins which involves countercurrent contacting or scrubbing the hydrogen chloride with a hydrocarbon boiling about 100° F. above the boiling point of benzene, i.e., about 275° F. The benzene absorbed in this hydrocarbon can thereafter be removed by distillation.

It is an object of this invention therefore to provide a method for the purification of the hydrogen chloride produced as a by-product in the alkylation of benzene with chloroparaffins.

It is another object of this invention to provide a method for removing benzene from the hydrogen chloride gas produced as a by-product of the alkylation of benzene with chloroparaffins.

It is another object of this invention to provide a method for scrubbing the gaseous hydrogen chloride stream produced by the alkylation of benzene with chloroparaffins wherein a hydrocarbon boiling about 100° F. above the boiling point of benzene is utilized as the scrubbing medium.

Other objects of this invention will be apparent from the following description of the preferred embodiments and from the claims.

DESCRIPTION OF THE PREFERRED EMBODIMENTS

This invention is applicable to any aluminum chloride catalyzed alkylation process wherein benzene is alkylated with a chlorinated paraffin, but it is particularly applicable to alkylation processes utilized for the production of synthetic detergents, i.e., wherein chloroparaffins having from 9 to 18 carbon atoms are utilized to alkylate benzene in the presence of aluminum chloride catalyst. As has been pointed out the chlorination of the paraffins also produces hydrogen chloride, however, this stream is easily separated from the paraffin-cycloparaffin mixture and therefore is relatively pure.

The hydrogen chloride produced in the alkylation reaction, however, is contaminated with benzene even after compressing and cooling the hydrogen chloride stream to a temperature of 50° F. to 120° F. and generally in amounts of ambout 1,000 parts per million. This contamination makes the hydrogen chloride difficult to use for either the production of aqueous hydrochloric acid because of storage tank material problems or for use as a chemical reagent.

It has been found in accordance with this invention that if a hydrocarbon boiling about 100° F. above the boiling point of benzene is employed in a countercurrent scrubber or absorber tower as the scrubbing or absorbing medium the benzene content of the hydrogen chloride gas can be reduced to the 30 to 50 parts per million level rather readily which makes the gas usable either in aqueous hydrochloric acid solutions or in chemical processing.

The hydrocarbons which can be utilized include the unreacted paraffins which are recycled in the process to the chlorination step or any of the alkylated benzene fractions may be used, i.e., the light alkylate which boils in the range of about 450° F. to 520° F., heart cut alkylate which boils in the range of from about 520° F. to 620° F. or heavy alkylate which boils in the range of about 620° F. to 750° F. or above.

A convenient method for carrying out the process of this invention involves utilizing a portion of the heavy alkylate which is recycled to the alkylation reaction as the absorbing medium in a tower through which the hydrogen chloride gas from the alkylation step is passed. The scrubbed hydrogen chloride gas with the desired low benzene content is removed from the top of the tower and can be combined with the hydrogen chloride gas from the chlorination step. The heavy alkylate enriched in benzene is then introduced into the alkylation reactor or alternatively it can by-pass the alkylation reactor and be distilled for benzene removal and be recycled again as scrubbing liquid.

The scrubber or absorber tower can operate at atmospheric pressure; however, it is preferable that it be operated at between 10 p.s.i.g. and 100 p.s.i.g. The tower can operate at a temperature in the range of from about 50° F. to the boiling point of benzene, however, it is preferable for economic reasons and for viscosity reasons that it operate from about 100° F. to 140° F.

The example which follows is provided for the purpose of illustrating additional specific embodiments of the invention and to demonstrate the utility of the invention. This example, however, should not be construed as limiting.

EXAMPLE

The gas produced from the alkylation reaction in a commercial detergent alkylate plant was used as the charge stream for testing the method of this invention. In the plant, straight chain paraffins in the $C_{10}$ to $C_{14}$ range were chlorinated to produce predominantly monochlorides with only minor amounts of polychlorides. This mixture of paraffins and chloroparaffins was passed into an alkylation reactor wherein benzene was the aromatic hydrocarbon to be alkylated and the catalyst was the conventional aluminum chloride catalyst used in such commercial plants.

The hydrogen chloride gas stream from the alkylation reactor contained about 1,000 p.p.m. of benzene. This stream was introduced into the bottom of a bubble tray tower of conventional design, the tower was 1.4 feet in diameter and 42.6 feet high with 32 bubble trays. The hydrogen chloride gas stream entered the bottom of the tower at a temperature of 105° F. and a pressure of 39 p.s.i.g. Heavy alkylate from the process, i.e., that fraction from the alkylator boiling above about 620° F. was introduced into the top of the tower at a temperature of 105° F. This amount of heavy alkylate introduced was about 6,160 pounds per hour and the amount of gas leaving the tower was 2,810 pounds per hour. It was found that the aromatic content of the hydrogen chloride leaving the tower had been reduced to between 20 and 30 parts per million.

This aromatic content was the combined amount of benzene and alkylated aromatics from the heavy alkylate. No other process is known which will lower the benzene or aromatic content of hydrogen chloride to this level, no process giving amounts in the range of from 200 to 300 parts per million.

This actual test run demonstrates the operability, utility and superiority of the process of this instant invention.

As many possible embodiments can be made of this invention without departing from the broad scope therof, it is to understood that all matter herein set forth is to be interpreted as illustrative and not as unduly limiting the invention.

I claim:

1. A method for removing benzene from a benzene-containing hydrogen chloride gas stream produced as a by-product in the alkylation of benzene with chloroparaffins in the presence of an aluminum-chloride catalyst which comprises countercurrently contacting the hydrogen chloride gas stream with an alkylated benzene hydrocarbon boiling above about 275° F. and thereafter recovering the purified hydrogen-chloride.

2. The method according to claim 1 wherein the chloroparaffins contain from 9 to 18 carbon atoms.

3. The method according to claim 1 wherein the hydrocarbon is an alkylated benzene fraction boiling an the range of about 450° F. to 520 F..

4. The method according to claim 1 wherein the hydrocarbon is an alkylated benzene fraction boiling in the range of from about 520° F. 620° F.

5. The method according to claim 1 wherein the hydrocarbon is an alkylated benzene fraction which boils in the range of about 620° F. to 750° F.

6. The method according to claim 1 wherein the chloroparaffins are straight chain in the $C_{10}$ to $C_{14}$ range, the hydrocarbon is an alkylated benzene fraction boiling in the range of from about 620° F. to 750° F. and the hydrogen chloride gas stream is countercurrently contacted wtih an alkylated benzene fraction boiling in the range of from about 620° F. to 750° F. in a tower operated at a pressure of about 40 p.s.i.g. and at a temperature of about 105° F.

7. The method according to claim 1 wherein the benzene-containing hydrogen chloride gas stream is countercurrently contacted with the hydrocarbon in an absorber tower operated at a pressure between atmospheric and 100 p.s.i.g. and at a temperaure in the range of from about 50° F. to about 175° F.

8. The method according to claim 7 wherein the pressure is in the range of from 10 p.s.i.g. to 100 p.s.i.g. and the temperature is in the range of from about 100° F. to 140° F.

9. The method according to claim 1 wherein said alkylated benzene hydrocarbon is produced by said alkylation of benzene with chloroparaffins and wherein said alkylated benzene hydrocarbon after contacting said hydrogen chloride gas stream is recycled to said alkylation of benzene step.

References Cited

UNITED STATES PATENTS

| | | | |
|---|---|---|---|
| 2,596,092 | 5/1952 | DeBenneville | 260—671 |
| 3,036,418 | 5/1962 | Kunzer et al. | 55—71 |
| 3,140,244 | 7/1964 | Simek et al. | 55—71 |
| 3,312,749 | 4/1967 | Hess et al. | 260—674 |
| 3,347,021 | 10/1967 | Hutton | 55—71 |

REUBEN FRIEDMAN, Primary Examiner

C. N. HART, Assistant Examiner

U.S. Cl. X.R.

23—154; 260—671, 674